UNITED STATES PATENT OFFICE.

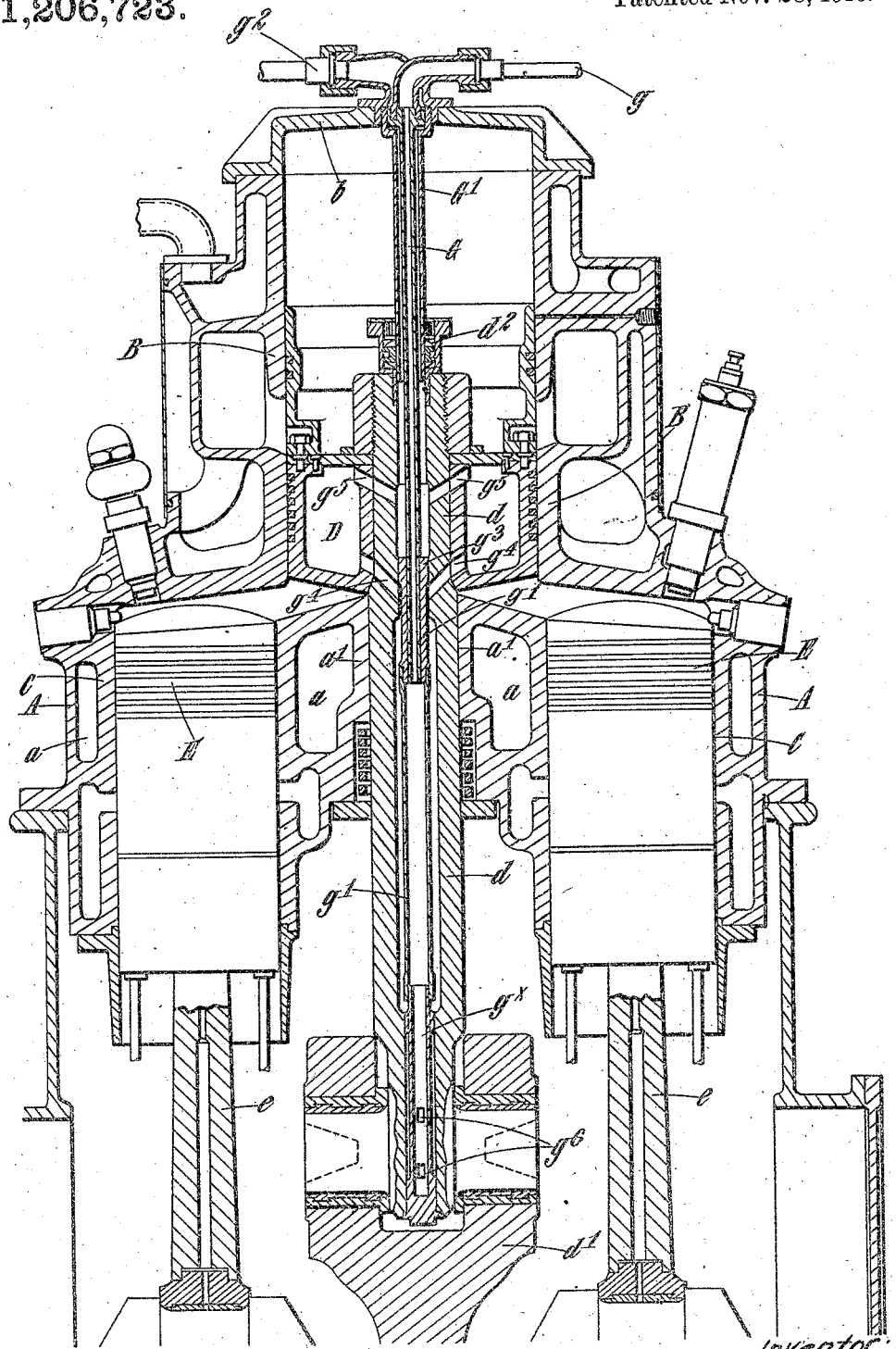

JAMES McKECHNIE, OF BARROW-IN-FURNESS, ENGLAND, ASSIGNOR TO VICKERS LIMITED, OF LONDON, ENGLAND.

MEANS FOR COOLING PISTON-RODS AND PISTONS.

1,206,723.  Specification of Letters Patent.  Patented Nov. 28, 1916.

Original application filed February 12, 1916, Serial No. 77,937. Divided and this application filed June 29, 1916. Serial No. 106,634.

*To all whom it may concern:*

Be it known that I, JAMES McKECHNIE, a subject of the King of Great Britain, residing at Naval Construction Works, Barrow-in-Furness, in the county of Lancaster, England, have invented certain new and useful Improvements in Means for Cooling Piston-Rods and Pistons, of which the following is a specification.

This invention relates to means for water cooling the piston rods and pistons of internal combustion engines of large size and more especially to the cooling of the large central piston and rod of a three piston engine of balanced type, in which the central and outer pistons travel in opposite directions.

According to this invention fixed concentric water tubes pass through the end of the cylinder and extend into the piston rod, the central fixed tube passing through the upper part of the hollow piston rod which is also provided with a central tube making a sliding contact with the fixed tube and forming an annular water channel throughout the length of the rod. The piston is hollow and communicates with the annular water channel surrounding the fixed central tube, the water passing through the central tubes in one direction and through the surrounding annular channel in the other, flowing through the hollow piston in its course.

In order that the said invention may be clearly understood and readily carried into effect, the same will now be described more fully with reference to the accompanying drawing, which shows in vertical section part of a balanced three piston engine having the improved cooling means for its central piston rod and piston.

A is the engine casing.

B is the central cylinder and C, C are the outer cylinders.

D is the large central piston with heavy tubular piston rod $d$ and E, E are the smaller side pistons working in the opposite direction to the piston D and with a combined cross sectional area equal to that of the central piston. The piston rod $d$ is provided with the short thick connecting rod $d'$ leading to the corresponding crank of the crank shaft. Connecting rods $e$ are provided for the side trunk pistons E.

G is a fixed inner tube and G' an outer tube leading the cooling water through the central piston rod $d$ and piston D.

The casing A is provided with the water jacket $a$ around the central cylinder B and the side cylinders C, the lower part of the jacket also surrounding the central part $a'$ of the casing, through which the tubular piston rod $d$ passes, so that the water jacket assists in cooling this rod.

Water is introduced by the inlet $g$ through the fixed tube G that leads through the center of the cylinder or pump cover $b$ and passes into the end of the piston rod tube $g'$, which slides upon the tube G as the piston reciprocates. The outer fixed tube G' having an outlet $g^2$ at its upper end surrounds the central inlet tube G, leaving an annular channel for the outward flow of the water, this outer tube passing through a stuffing box $d^2$ in the upper end of the piston rod $d$ which extends through the piston. The stuffing box therefore slides upon the tube G' as the piston reciprocates, maintaining a water tight joint.

The tube $g'$ extends from the tube extension $g^x$ at the outer end of the rod $d$ to just within the piston D, which is hollow. A small collar at $g^3$ closes the annular passage at the top of the tube $g'$ immediately above openings $g^4$ formed in the piston rod and piston and leading to the interior of the latter, return openings $g^5$ passing back from the upper part of the piston chamber to the water channel in the rod $d$. The central tube extension $g^x$ is perforated at $g^6$ to allow of communication with the annular return channel formed between the tube and the inner wall of the tubular piston rod.

The cooling water flows downwardly the central tubes G and $g'$ to the lower end of the piston rod $d$, thence upwardly through the annular passage surrounding the tube $g'$ to the openings $g^4$ into the interior of the piston D, back through the return openings $g^5$ to the annular passage inside the piston rod and thence to the outlet $g^2$ through the annular passage between the two fixed tubes G and G'. An efficient circulation through all parts of the piston and piston rod exposed to high temperature is thus obtained, and the circulation is assisted by the reciprocation of the piston and piston rod upon the fixed water tubes G and G'.

What I claim and desire to secure by Letters Patent of the United States is:—

1. In an internal combustion engine a cylinder, a piston, a tubular piston rod, fixed water inlet and outlet tubes arranged one within the other and passing through the end of the cylinder and a central water tube in the said piston rod, making sliding contact with the central fixed tube, the said water tubes being adapted to provide a longitudinal flow of cooling water in the piston rod through the central tubes and surrounding annular channel.

2. In an internal combustion engine a cylinder, a hollow piston, a tubular piston rod, passages leading from the hollow rod to the upper and lower ends of the piston cavity, fixed water inlet and outlet tubes arranged one within the other and passing through the end of the cylinder, a central water tube extending through the tubular piston rod and making sliding contact with the central fixed tube, the upper end of the said piston rod tube closing the annular water passage between the upper and lower passages leading to the piston cavity, the said water tubes being arranged to provide a flow of cooling water through the central tubes, the surrounding annular channel and the piston cavity.

In testimony whereof, I herewith affix my signature.

JAMES McKECHNIE.